C. J. GUNDLACH.
LIGHT REFRACTING GLASS.
APPLICATION FILED AUG. 17, 1917.
1,277,065. Patented Aug. 27, 1918.
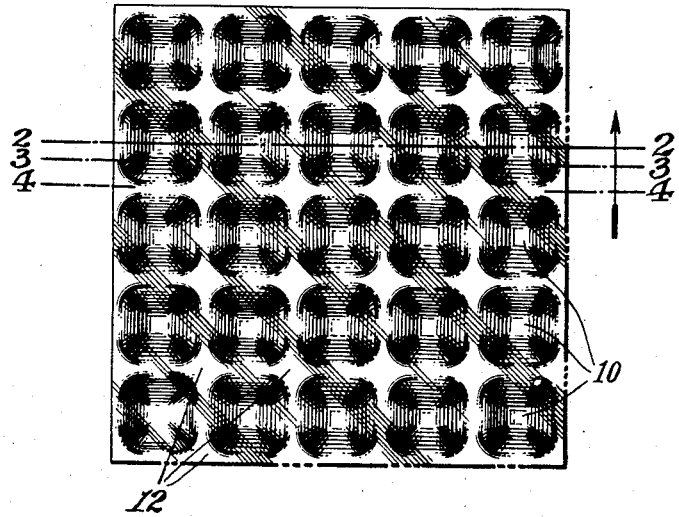
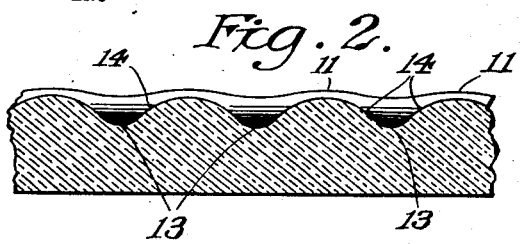
Inventor
Conrad J. Gundlach
By his Attorneys
Kerr Page Cooper + Hayward

UNITED STATES PATENT OFFICE.

CONRAD J. GUNDLACH, OF NEW YORK, N. Y., ASSIGNOR TO MISSISSIPPI GLASS COMPANY, OF NEW YORK, N. Y., A CORPORATION OF NEW YORK.

LIGHT-REFRACTING GLASS.

1,277,065.          Specification of Letters Patent.      Patented Aug. 27, 1918.

Application filed August 17, 1917. Serial No. 186,679.

*To all whom it may concern:*

Be it known that I, CONRAD J. GUNDLACH, a citizen of the United States, residing at New York, in the county and State of New York, have invented certain new and useful Improvements in Light-Refracting Glass, of which the following is a full, clear, and exact description.

This invention relates to improvements in light refracting glass which is particularly adaptable for use in factory windows to prevent "glare." The uses of this form of glass are, of course, not limited to factory window use. The glass has been found well adapted for use in automobile headlights and other uses where it is desirable to eliminate glare and refract light rays.

In automobile headlight practice and in certain other uses where refracting glass is utilized, it has been the custom to use a glass whose surface is de-formed by small lenses. In some cases these lenses have been placed upon the front and back of the glass in an overlapping manner. In other instances one surface of the glass is provided with a number of prisms pressed into the glass and having relatively straight sides. In both of these constructions diffusion of the light rays is secured which to a certain extent diminishes the glare. However, in both constructions, there is sufficient relatively flat area through which direct light beams can pass, and so affect the eyes as to produce glare. With the prismatic construction there is an additional disadvantage in that considerable light is redirected back toward the source of light thereby diminishing the light transmitting efficiency of the glass.

The present construction embodies a glass having one side roughened with a number of minute depressions. These depressions are of such contour that the light is split up in such a way as to produce the minimum of glare. The depressions also are of such shape as to cause the maximum efficiency of light transmission.

In the drawing, I have illustrated one embodiment of my invention.

Figure 1 shows a front view of my improved glass. This and the succeeding views are greatly magnified in order to show the structure clearly.

Fig. 2 is a section taken on line 2—2 of Fig. 1.

Fig. 3 is a section taken on line 3—3 of Fig. 1.

Fig. 4 is a section taken on line 4—4 of Fig. 1.

In order to prevent the effect of glare I have found that it is preferable to break up the direct light beams which pass through the glass into smaller beams of such size as not to individually affect the eye in such a manner as to cause glare. I attribute this result to the fact that beams of appreciable size cause a glare effect, whereas the same amount of light may project through a glass without the effect of glare if the individual relatively large beams are broken up into smaller direct beams of such size as not to cause the glare effect upon the eye.

In order to manufacture a glass which will so break up the light beams, I preferably cross rib a table upon which the glass is to be rolled with a plurality of ribs. I preferably employ about 30 ribs per inch in one direction and a similar number of ribs in a direction at right angles to the first mentioned ribs. Such a table will impress 900 depressions per square inch in the glass. These depressions, largely magnified, are shown at 10 in Fig. 1. They may be said to be pyramidal pits arranged in tessellar order and separated by slight undulating crests 11 best shown in Fig. 4.

The contour of the pits is preferably rounding and not straight, as clearly shown at 14 in Fig. 2 of the drawings. This undulating contour is of importance in that it diffuses the rays into a plurality of directions, rather than in parallel straight lines as would be the case if the sides of the pits were straight or relatively flat.

The depth of the pits with relation to their size also affects the light transmitting efficiency of the glass. By making the pits of such depth that the lines of tangency to the sides of the pits intersect at an angle greater than 90° direct reflection will be avoided thereby preventing the redirection of the light beams back to the source, which reduces the light transmitting efficiency.

The flat portions of the prism side of the glass comprise the top portions 12 and the bottom of the pits at 13. The areas of the relatively flat places are individually exceedingly small since there are, as previously explained, about 900 pits per square inch. These flat places allow direct straight beams to pass through the glass without refraction. I believe that glare upon the human eye by these direct rays is avoided for the reason that the area of the individual beams is so small.

It will be understood that I do not wish to limit my invention to the exact number of pits per inch herein set forth, but merely to such a number of pits as to impart a relatively uniform luminous appearance of light to one in front of the glass instead of an appearance of concentrated light beams at different points thereon.

I attribute considerable of the efficiency of light transmission to the method of manufacture of the glass. The hot glass is rolled upon a ribbed table and while still hot is "sworded" to remove the glass from the table. This imparts a fire polish to the glass on the pitted side. The flat side may afterward be polished in the usual manner. The fire polish is adapted to more efficiently transmit the light than the usual "pressed" molded glass. Furthermore, as the swording operation is carried out, when the glass is partially plastic, the edges of the pits and the surfaces round out before cooling thereby imparting the undulating character to the pits heretofore mentioned.

It will be understood that the present invention is susceptible of various modifications as will occur to those skilled in the art.

What I claim as my invention is particularly pointed out in the appended claims.

I claim:

1. As an article of manufacture, a sheet of glass having in one of its surfaces minute depressions of such contour and in such number for a given area as to break up and diffuse direct glare producing rays of light into smaller rays which produce upon the eye no glare.

2. As an article of manufacture, a sheet of glass having minute depressions in one of its surfaces of such contour that these surfaces will not reflect the light back to the source thereof, and assembled in such number and relation as to diffuse the light which passes through the glass.

3. As an article of manufacture, a glass having a plurality of wavy depressions upon a surface thereof, the surfaces of said depressions being of such contour as not to direct light back to the source thereof, but being adapted to diffuse the light passing through the glass, and the number of said depressions being such as to intercept large direct light beams which would cause glare and to permit the passage of smaller direct light beams which do not cause glare.

4. As an article of manufacture, a glass having a cross ribbing on a surface thereof adapted to form a series of pits or depressions in the surface of the glass, said cross ribs being substantially 30 per inch of length, whereby light passing through the glass is diffused and large direct glare producing rays are split into smaller rays which do not give an effect of glare to the human eye.

5. As an article of manufacture, a glass having a flat face and a roughened face, said latter face having a plurality of pits therein arranged in tessellar order, said surface having substantially 900 of said pits per square inch.

6. As an article of manufacture, a glass sheet or plate having one surface flat and polished and the opposite surface having a fire polish, said latter surface formed with a great number of depressions therein, undulating in contour and spaced in such close relation as to break up and diffuse glare-producing beams of light into minute beams which do not produce glare.

In testimony whereof I hereunto affix my signature.

CONRAD J. GUNDLACH.

Copies of this patent may be obtained for five cents each, by addressing the "Commissioner of Patents, Washington, D. C."